United States Patent [19]

Grzina

[11] Patent Number: 4,895,460
[45] Date of Patent: Jan. 23, 1990

[54] SEALING FOR BEARING ASSEMBLIES

[75] Inventor: Anthony Grzina, Drummoyne, Australia

[73] Assignee: Warman International Limited, Artarmon, Australia

[21] Appl. No.: 86,147

[22] PCT Filed: Oct. 16, 1986

[86] PCT No.: PCT/AU86/00309
§ 371 Date: May 22, 1987
§ 102(e) Date: May 22, 1987

[87] PCT Pub. No.: WO87/02747
PCT Pub. Date: May 7, 1987

[30] Foreign Application Priority Data

Oct. 22, 1985 [AU] Australia ............................... PH3024

[51] Int. Cl.[4] .................... F16C 33/72; F16C 33/80
[52] U.S. Cl. ................................. 384/132; 277/57; 277/71; 277/79; 384/462; 384/477; 384/480
[58] Field of Search ............... 384/131, 132, 135, 143, 384/144, 400, 401, 473, 474, 475, 462, 477, 478, 480, 489; 277/57, 71, 79

[56] References Cited

U.S. PATENT DOCUMENTS

| | | | |
|---|---|---|---|
| 715,042 | 12/1902 | Fanning | 384/400 |
| 1,385,906 | 7/1921 | Crutchfield et al. | 384/135 |
| 1,484,525 | 2/1924 | Noeggerath | 384/132 |
| 1,840,127 | 1/1932 | Penney | 384/132 |
| 1,871,661 | 8/1932 | Carrier | 384/132 |
| 2,195,794 | 4/1940 | Weckstein | 384/486 |
| 2,253,350 | 8/1941 | Ross et al. | 384/131 |
| 3,512,853 | 5/1970 | Petros | 277/57 X |
| 3,869,131 | 3/1975 | Derner | 277/71 X |
| 4,101,139 | 7/1978 | Nordin | 277/71 X |

FOREIGN PATENT DOCUMENTS

| | | | |
|---|---|---|---|
| 187349 | 10/1956 | Austria | 384/131 |
| 975981 | 1/1963 | Fed. Rep. of Germany | 277/57 |
| 761224 | 11/1956 | United Kingdom . | |

Primary Examiner—Thomas R. Hannon
Attorney, Agent, or Firm—Amster, Rothstein & Ebenstein

[57] ABSTRACT

An improved bearing assembly provided with means whereby grease is supplied via a passageway (10) to egress between 2 bearing rings (1), whereby grease will pass by the outer sealing ring (1A) to be expelled through the labyrinth passage (3) to flush contaminants out of the seal.

7 Claims, 2 Drawing Sheets

SEALING FOR BEARING ASSEMBLIES

The present invention relates to an improved seal for bearing assemblies.

Bearing assemblies are used in rotodynamic fluid machines such as pumps, turbines, agitators and the like to house bearings and support a shaft which normally protrudes from both ends of the bearing housing to connect the rotating element(s) of the fluid machine to the fluid machine drive.

Bearings require a clean well lubricated environment to operate. With the shaft protruding from the bearing assembly from either one or two ends, it is necessary to enclose and seal the bearing housing ends. As the shaft rotates in a stationary housing, it is necessary to use seals which minimise the frictional losses and heat generation.

Fluid machines often operate in harsh environments where air or water borne contaminants are present at or near the bearing housing and enclosures. Centrifugal slurry pumps in particular are open to severe environmental influences as the shaft enters the pump by way of a gland arrangement which in its standard form is designed to leak slightly to allow lubrication of the gland sealing elements. This small leakage is in close proximity to the end of the bearing housing.

The bearing seals which fit into the ends of the bearing housing can be selected from any number of known types or special types could be developed. Certain seal arrangements incorporate a labyrinth (small clearance passageway) to effect the sealing and others incorporate element(s) which rub on the rotating shaft or a shaft mounted component. As such all seals have a potential to allow contaminants into the bearing housing which can become worse as the sealing element(s) wear.

Figure 1:
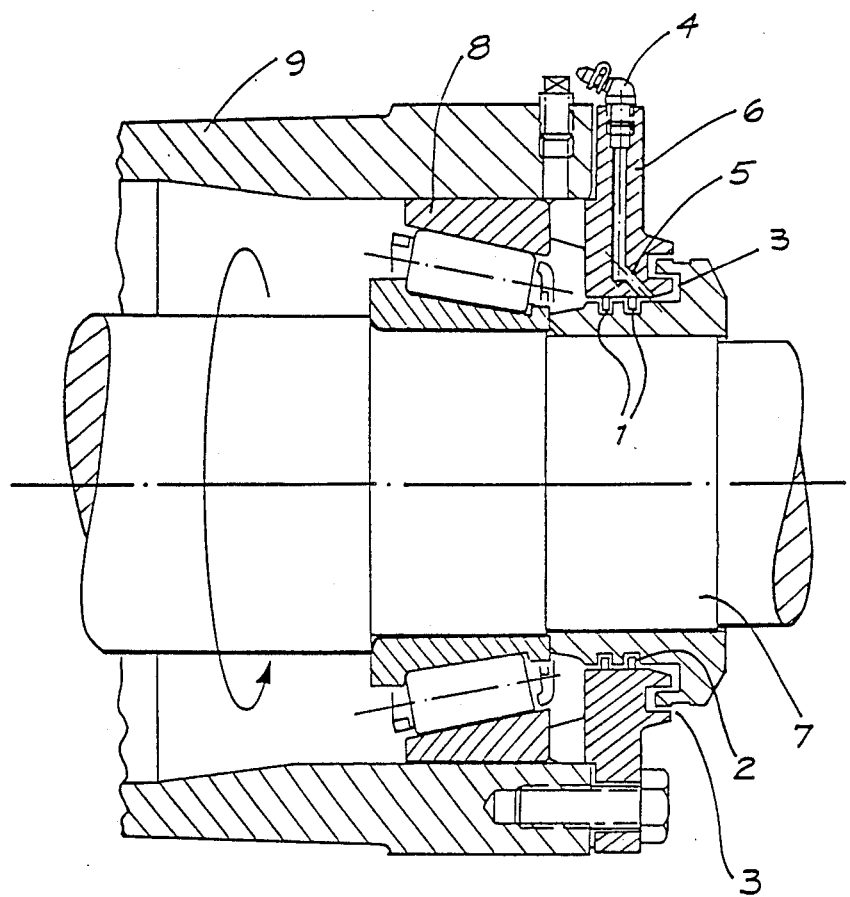
FIG. 1 illustrates a prior art bearing assembly.

A typical prior art bearing assembly is illustrated in FIG. 1 in which the pump impeller shaft 7 is held by bearings 8 in the bearing housing 9. This pump uses end closures incorporating two piston rings 1 located in grooves 2 on the shaft collar as the inner sealing elements and a labyrinth passage 3 as the outer sealing elements. This form of sealing has proved more effective when the labyrinth passage 3 is purged with grease. Grease is pumped by means of a grease gun (not shown) being connected to the grease nipple 4 through the flushing bore 5, in the bearing housing end cover 6, to the outside of the outer piston ring 1 into the labyrinth passage 3.

The grease purge is normally applied at regular intervals but in some applications has not proved entirely effective in keeping contaminants away from the piston ring seals which have only limited ability to seal against the usual water borne contaminants experienced in the mining industry.

The main problem with the existing grease purging arrangement is that grease is flung out of the labyrinth passage by centrifugal action when the pump is running. The greasing period, in general practice, is longer than the time taken for the grease to be expelled by centrifugal action. Potential contaminants can more easily enter the labyrinth if no grease is present, especially if the pump is stopped, and work their way past the piston rings to eventually reach the bearings.

The present invention seeks to overcome these disadvantages by providing a bearing assembly comprising at least two seal rings spaced a short distance apart from each other to form the inner sealing elements, a labyrinth passage to form the outer sealing element, a passageway extending externally of the bearing assembly into the space between the at least two of said spaced apart seal rings.

Figure 2:
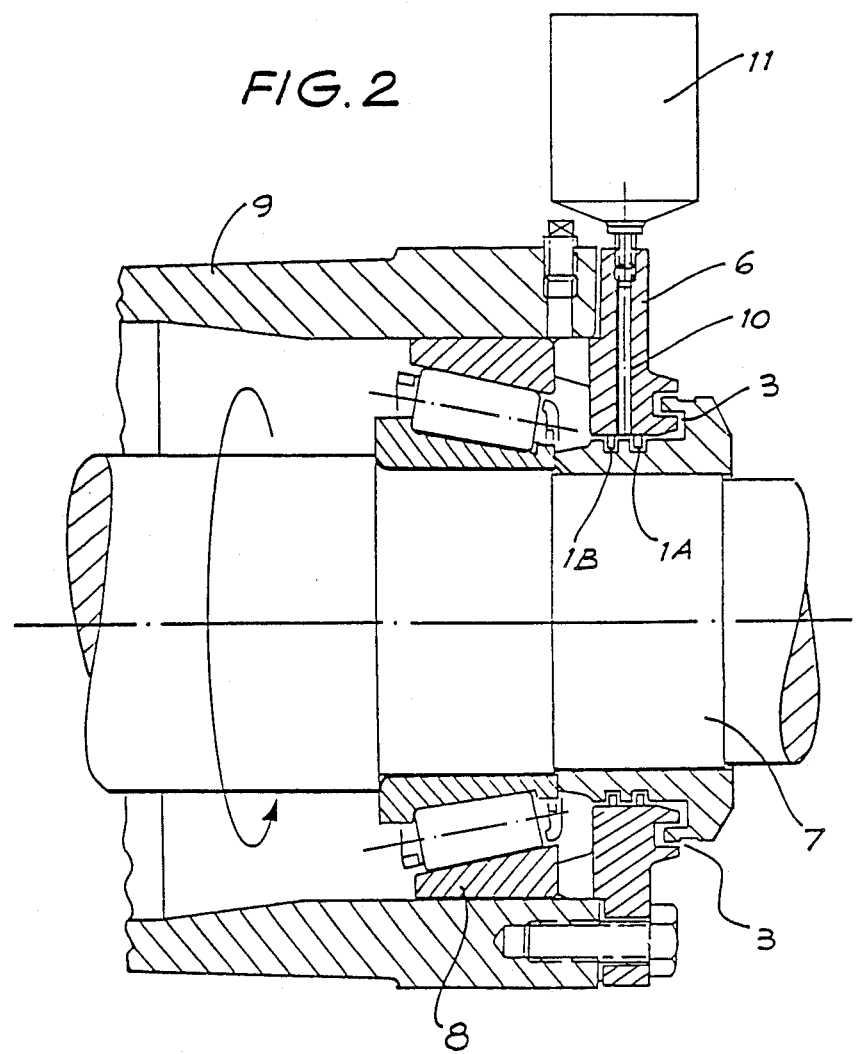
FIG. 2 illustrates the present invention seal arrangement.

The invention will now be described with reference to FIG. 2 which illustrates one embodiment of the present invention. The designation numerals appearing in this drawing represent the same features as the features designated by the same numerals in FIG. 1.

The sealing arrangement is physically very similar to the seal arrangement shown in FIG. 1 in that it consists of two seal rings 1A and 1B spaced a short distance apart to form the inner seal elements and a labyrinth 3 forming the outer seal element. The improvement is embodied in the way the grease is used not so much to flush contaminants out but to provide a pressurised grease barrier, between the two seal rings, which is maintained at all times regardless of whether the pump is stopped or running.

The grease is applied via feed passageway 10 from an automatic grease feeder 11, located on the bearing housing end cover 6, to the space between the two piston rings 1. Thus a small but constant amount of grease under pressure is supplied regardless of pump operation.

The grease can travel in two directions. The grease which passes the inner seal ring 1B and enters the bearing housing assists in lubrication of the bearings 8. The grease which passes the outer seal ring 1A enters the labyrinth seal 3 and while the pump is running the grease will be expelled through the labyrinth passage to the outside by centrifugal action, thereby flushing out any contaminants at the same time.

An additional advantage of the improved seal is that any wear of the sealing elements will not adversely affect the overall sealing ability of the arrangement as the grease barrier is maintained at all times.

Thus the improved sealing arrangement will reduce bearing failures caused by outside contaminants. While the pump is running the potential contaminants will have their initial energy killed by the high energy spinning labyrinth before coming up against the pressurised grease barrier. While the pump is stopped, any contaminants will not be able to pass the pressurised grease barrier.

It should be obvious to people skilled in the art that modifications could be made to the seal arrangement without departing from the spirit or scope of the present invention.

I claim:

1. In a bearing assembly for a rotating shaft assembly defining at least two grooves and an annular projection therebetween, a bearing seal comprising:

at least two piston rings, spaced apart from each other and supported on the bearing assembly, to form an inner sealing element, each said piston ring being adapted to be at least partially received in a respective one of the grooves of the rotating shaft assembly;

a labyrinth passage forming an outer sealing element;

a passageway extending externally of the bearing assembly into a space between at least two of said spaced apart piston rings; and an automatic grease feeder connected to said passageway to discharge grease into the space, whereby grease discharged from said automatic feeder flows under pressure over said piston rings to cause a layer of grease to lie between said piston rings and the rotating shaft assembly, and to flow through said labyrinth and through said inner sealing element to form a seal against the ingress of material past the bearing seal.

2. A bearing seal according to claim 1 wherein said space located intermediate said at least two piston rings is configured and dimensioned to receive an annular projection on the rotating shaft assembly.

3. A bearing seal according to claim 2 wherein said automatic feeder is a continuous feeder.

4. In combination, a rotating shaft assembly and a bearing seal according to claim 2 wherein said rotating shaft assembly defines means for immediately constraining grease discharged into said space located intermediate said at least two piston rings to migrate axially in generally opposite directions, a portion toward the bearing and a portion towards and through said labyrinth.

5. A bearing seal according to claim 1 wherein said automatic feeder is a continuous feeder.

6. In combination, a rotating shaft assembly and a bearing seal according to claim 1 wherein said rotating shaft assembly defines means for immediately constraining grease discharged into said space located intermediate said at least two piston rings to migrate axially in generally opposite directions, a portion toward the bearing and a portion towards and through said labyrinth.

7. In combination, a rotating shaft assembly and a bearing seal according to claim 1 wherein said rotating shaft assembly defines at least two grooves, each to at least partially receive one of said at least two piston rings and an annular projection therebetween.

* * * * *